Oct. 6, 1931.  S. D. LOWRY  1,826,519
INDIVIDUAL BUTTER CUTTING MACHINE
Filed Jan. 31, 1929    2 Sheets-Sheet 1

Inventor
S. D. Lowry.
By L. F. Kendrick Jr.
Attorney

Oct. 6, 1931.  S. D. LOWRY  1,826,519
INDIVIDUAL BUTTER CUTTING MACHINE
Filed Jan. 31, 1929  2 Sheets-Sheet 2
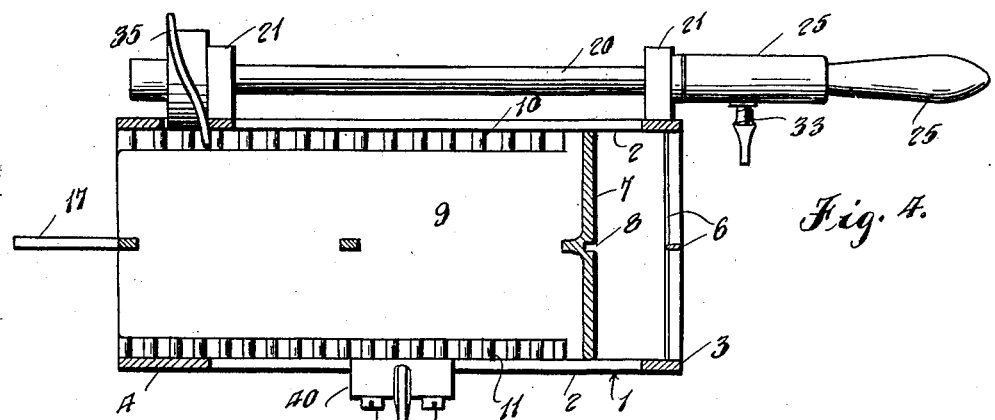
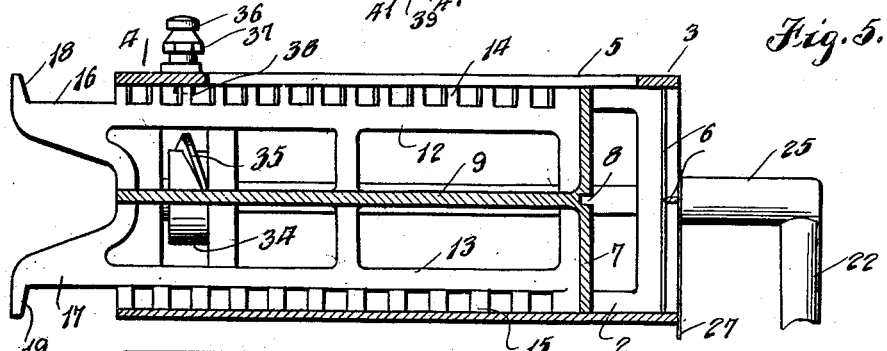
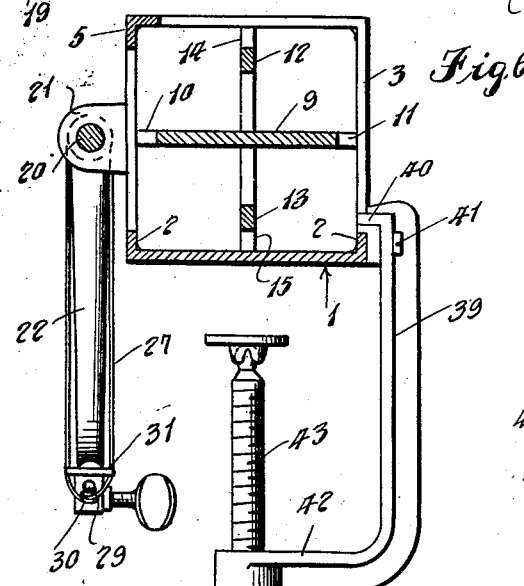
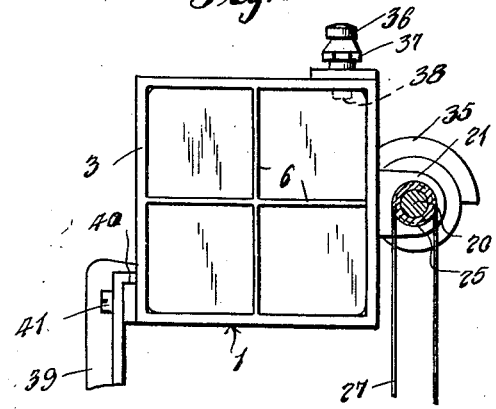
Inventor
S. D. Lowry
By
Attorney Patented Oct. 6, 1931

1,826,519

UNITED STATES PATENT OFFICE

SAMUEL DICKSON LOWRY, OF ELIZABETH, NEW JERSEY; LORENE LOWRY ADMINISTRATRIX OF SAID SAMUEL LOWRY, DECEASED

INDIVIDUAL BUTTER CUTTING MACHINE

Application filed January 31, 1929. Serial No. 336,516.

The invention relates to a machine for cutting butter into individual pieces or pats for table service and has for its object the provision of a machine that is adapted to be clamped to a table or any suitable support and arranged to receive a predetermined size of a block of butter and provided with means by which said block may be cut lengthwise into a plurality of sections, and said sections cut transversely into pieces or pats, provision being made for varying the thickness of the pieces cut.

Figure 1:
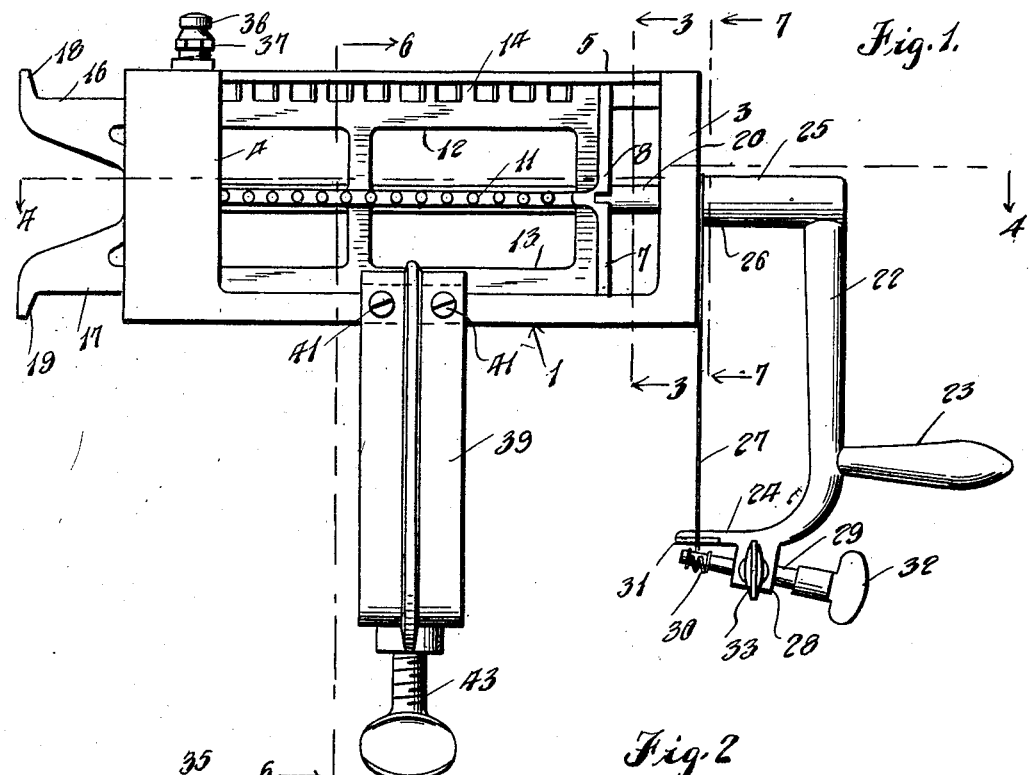
Figure 2:
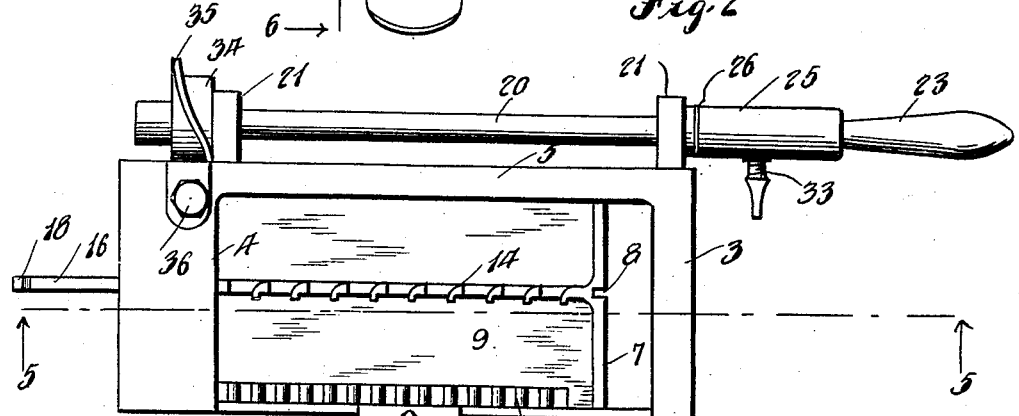
Figure 3:
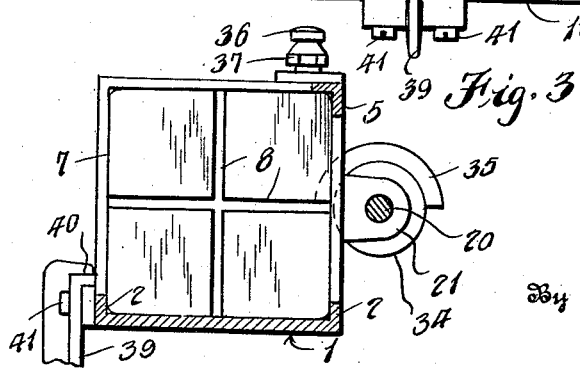

The invention will be described in detail hereinafter and will be found illustrated in the accompanying drawings in which Figure 1 is a side view in elevation of the improved butter cutter, Figure 2 is a top plan view, Figure 3 is a transverse sectional view on a plane indicated by the line 3—3 of Figure 1, Figure 4 is a longitudinal sectional view on a plane indicated by the line 4—4 of Figure 1, Figure 5 is a longitudinal sectional view on a plane indicated by the line 5—5 of Figure 2, and Figures 6 and 7 are transverse sectional views on planes indicated by the lines 6—6 and 7—7 of Figure 1, respectively.

In the drawings similar reference characters are used to designate corresponding parts throughout the several views.

In the machine selected for illustration in the drawings the device is designed to receive and cut a pound block of butter as usually prepared and sold, said blocks being of uniform dimensions, and the machine comprises a frame adapted to contain the pound block having a bottom 1 with upstanding flanges 2 on which the butter is supported, 3 and 4 indicating rectangular frames at the respective ends of the bottom 1. 5 indicating an angle bar connecting one of the upper corners of the frame members 3 and 4. Secured within the rectangular member 3 and preferably formed integral therewith are crossed knives or cutters 6 that are adapted to cut a pound block of butter into longitudinal strips, the butter being pushed against said knives by the mechanism to be hereinafter described.

Slidably mounted in the frame is a plunger 7 that has its front face provided with grooved recesses 8 that aline with the knives 6 to provide means by which the block of butter may be entirely pushed out of the frame at the end of the stroke of the plunger 7. Formed integral with the rear side of the plunger is a guide and strengthening means therefor comprising a plate 9 formed integral with the plunger and diametrically thereof and provided with spaced teeth 10 and 11, and also reinforcing members 12 and 13 arranged at right angles to the plate 9 and also diametrically arranged relatively to the rear side of the plunger and provided with teeth 14 and 15 in their outer edges, said teeth engaging the bottom and sides of the frame to guide the plunger in its movement in the frame. Said plate 9 and members 12 and 13 comprise a cruciform guide and reinforcement for the plunger 7 whereby it may be made of relatively thin material and will still sustain the thrust necessary to cut the butter in strips. The members 12 and 13 have rearwardly extended portions 16 and 17 with outwardly directed lugs 18 and 19 that serve as stops to limit the forward movement of the plunger 7 by engaging the rear end of the frame formed by the bottom plate and the rectangular member 4.

20 indicates a shaft arranged longitudinally of the frame and at one side thereof and journaled in bearing members 21, 22 indicating a crank member secured to said shaft and having a handle 23 for actuating the shaft, said crank member having its end inturned as shown at 24 thus forming a U-shaped member comprising the portion 25 that is secured to the shaft 20, crank arm 22, and the end member 24. Portion 25 is provided with a circumferential groove 26 to receive a cutting wire 27 while the member 24 is provided with a lug 28 in which is mounted a tapered pin 29 to which the ends of the wire 27 are secured as shown at 30. 31 indicates a plate secured to the end of the member 24 and provided with guide notches to receive the wire 27. The outer end of the pin 29 is flattened into a wing shape as shown at 32 to admit of turning the pin 29 to tighten the wire 27, and 33 indicates a clamp screw threaded into the projection 28 and adapted to clamp the pin 29 to hold it in adjusted position. 34 is a drum secured to the shaft 20 and having a mutilated thread 35 that is adapted to move the plunger 7 step by step by engagement of said thread 35 in one or the other of the set of the teeth hereinbefore referred to as 10, 11, 14 or 15. Each of the sets of teeth 10, 11, 14 and 15 are differently spaced so that by properly placing the plunger in position in the frame when placing the butter therein for cutting the thickness of the pats or pieces of butter that will be cut by the wire cutter 27 may be selected, and in operation it will be understood that after the severing operation by the wire cutter 27 the mutilated thread 35 which extends around the shaft 20 one hundred eighty degrees will move the plunger forward the distance of one of the spaces between the teeth that may at that time be engaged by the thread.

36 indicates a stop member that is slidably mounted in the sleeve 37, said stop member 36 including a stem 38 that extends below the frame member 4 and is designed to prevent the plunger 7 from being moved out of the frame until the stem 38 is raised to permit such removal.

To clamp the machine on a table or other support a removable clamp member is provided that consists of a bar 39 and having an offset portion 40 at one end to engage the side of the frame, and the clamp member is secured to the side of the frame by means of screw fastenings 41. The other end of the bar is also provided with an offset portion 42 in which is mounted a set screw 43 to engage the under side of a table top or other support for the frame.

What is claimed is:—

A butter cutter, comprising an open-ended frame adapted to receive a block of butter and the like a plunger slidably mounted in the frame, a reinforcement for said plunger comprising a cross-shaped web formed integral with said plunger and extending rearwardly thereof, spaced teeth provided on the side edges of said web adapted to engage the sides of the frame and guide the plunger, means engaging said teeth to actuate the plunger, and lugs on said cross-shaped web to engage the frame and limit the forward movement of the plunger.

In testimony whereof I affix my signature.

SAMUEL DICKSON LOWRY.